United States Patent [19]
Hori et al.

[11] Patent Number: 4,656,885
[45] Date of Patent: Apr. 14, 1987

[54] LUBRICATION MECHANISM IN FINAL DRIVE AND DIFFERENTIAL UNITS

[75] Inventors: Hiroshi Hori; Kiyoshi Taniyama, both of Toyota, Japan

[73] Assignee: Toyota Jidosha Kabushiki Kaisha, Japan

[21] Appl. No.: 682,144

[22] Filed: Dec. 17, 1984

[30] Foreign Application Priority Data

Dec. 23, 1983 [JP] Japan .................. 58-202826[U]

[51] Int. Cl.$^4$ .................. F16H 57/04; F16H 1/38; F01M 9/66
[52] U.S. Cl. .................. 74/467; 74/710; 184/6.12
[58] Field of Search .................. 74/467, 710; 184/6.12

[56] References Cited

U.S. PATENT DOCUMENTS

| | | | |
|---|---|---|---|
| 4,157,045 | 6/1979 | Suzuki | 184/6.12 |
| 4,227,427 | 10/1980 | Dick | 74/710 |
| 4,242,923 | 1/1981 | Nishikawa et al. | 184/6.12 |
| 4,244,242 | 1/1981 | Uno et al. | 74/710 |
| 4,261,219 | 4/1981 | Suzuki et al. | 74/710 |
| 4,271,717 | 6/1981 | Millward et al. | 74/467 |
| 4,319,499 | 3/1982 | Sanui et al. | 184/6.12 |

FOREIGN PATENT DOCUMENTS 2839886 5/1979 Fed. Rep. of Germany ........ 74/467

*Primary Examiner*—Kenneth J. Dorner
*Assistant Examiner*—Michael D. Bednarek
*Attorney, Agent, or Firm*—Parkhurst & Oliff

[57] ABSTRACT

In a final drive and differential unit comprising a ring gear integral with a differential gear unit rotatably mounted within a carrier, and a drive pinion shaft supported by a pair of axially spaced bearings within a cylindrical support structure of the carrier, the shaft extends outwardly through an oil seal member mounted within an outer end portion of the support structure and is provided at its inner end with a drive pinion in mesh with the ring gear. The support structure is formed at one side thereof with an enlarged portion formed therein with an oil supply passage opening at its one end into the carrier at the same side as the ring gear and is formed at the other side thereof with another enlarged portion formed therein with an oil return passage opening at its opposite ends into the carrier and into a first annular space between the oil seal member and the bearing. The support structure is formed in its side wall with first and second lateral holes respectively for communication between the oil supply for communication between the oil supply passage and the passage and a second annular space between the bearings and first annular space. The lowermost edge of the second lateral hole is positioned below the lowermost edge of the first lateral hole to ensure the flow of lubricating oil into the first annular space passing across the second lateral hole.

3 Claims, 3 Drawing Figures

LUBRICATION MECHANISM IN FINAL DRIVE AND DIFFERENTIAL UNITS

BACKGROUND OF THE INVENTION

The present invention relates to final drive and differential units for motor vehicles, and more particularly, but not exclusively, to a lublication mechanism in the final drive and differential unit.

Final drive and differential units are known of the type which comprises a differential carrier integrally formed with a cylindrical support structure and arranged to store an amount of lubricating oil therein, a differential gear unit rotatably mounted within the carrier, a ring gear contained within the carrier and mounted on the differential gear unit for rotation therewith, and a drive pinion shaft supported by a pair of axially spaced bearings mounted within the cylindrical support structure, and in which the drive pinion shaft extends outwardly through an annular oil seal member mounted within an outer end portion of the support structure and is integrally provided at its inner end with a drive pinion in mesh with the ring gear.

In such a final drive and differential unit as described above, the bearing facing the interior of the carrier is directly splashed with lubricating oil picked up by rotation of the ring gear, but the other bearing and the oil seal member may not be splashed with the picked up lubricating oil. It is, therefore, necessary to provide positive lubrication of the latter bearing and the oil seal member so as to ensure durability of the final drive and differential unit. In this respect, there has been proposed a lubrication mechanism for the bearing and the oil seal member, wherein an oil supply passage is formed in the upper portion of the cylindrical support structure to receive the lubricating oil picked up by rotation of the ring gear and supply it into an annular space around the drive pinion shaft between the bearings, and an oil return passage is formed in the bottom portion of the cylindrical support structure to permit the lubricating oil passing through the other bearing to return into the interior of the differential carrier. In such arrangement of the oil passages in the cylindrical support structure, it is difficult to effect sufficient lubrication of the bearing and the oil seal member during low speed rotation of the ring gear. If the oil supply passage is arranged to supply a sufficient amount of lubricating oil during low speed rotation of the ring gear, the oil seal member will be supplied with an excessive amount of lubricating oil during high speed rotation of the ring gear, resulting in leakage of the oil across the oil seal member.

SUMMARY OF THE INVENTION

Accordingly, it is a primary object of the present invention to provide an improved lubrication mechanism in which the oil seal member is supplied with a sufficient amount of lubricating oil during low speed rotation of the ring gear without causing any leakage of the oil thereacross during high speed rotation of the ring gear, and which is relatively simple in construction and is economical to manufacture.

According to the present invention there is provided a lubrication mechanism for the final drive and differential unit, wherein the cylindrical support structure of the carrier is formed at one side thereof with an enlarged portion formed therein with an oil supply passage in parallel with the drive pinion shaft and in open communication at its one end with the interior of the carrier at the same side as the ring gear and is formed at the other side thereof with another enlarged portion formed therein with an oil return passage in parallel with the drive pinion shaft and in open communication at its one end with the interior of the carrier at the opposite side of the ring gear and at its other end with a first annular space around the drive pinion shaft between the oil seal member and the bearing adjacent thereto, the support structure being formed in its side wall with a first lateral hole connecting an intermediate portion of the oil supply passage with a second annular space around the drive pinion shaft between the bearings and being further formed in its side wall with a second lateral hole connecting the other end of the oil supply passage with the first annular space, and wherein the lowermost edge of the second lateral hole is positioned below the lowermost edge of the first lateral hole to ensure the flow of lubricating oil into the first annular space passing across the second lateral hole during low speed rotation of the ring gear.

In operation, when the ring gear is rotated at a low speed, a small amount of lubricating oil is picked up by the ring gear and flows through the bottom portion of the oil supply passage into the first annular space across the second lateral hole to effect sufficient lubrication of the oil seal member. When the ring gear is rotated at a high speed, a large amount of lubricating oil is picked up by the ring gear and flows through the oil supply passage into the first and second annular spaces respectively across the first and second lateral holes to effect sufficient lubrication of both the bearings and the oil seal member without causing any leakage of the oil across the oil seal member.

BRIEF DESCRIPTION OF THE DRAWINGS

Additional objects and advantages of the present invention will become more readily apparent from the following detailed description of a preferred embodiment thereof when taken together with the attached drawings, in which.

DETAILED DESCRIPTION OF THE PREFERRED EMBODIMENT

Figure 1:
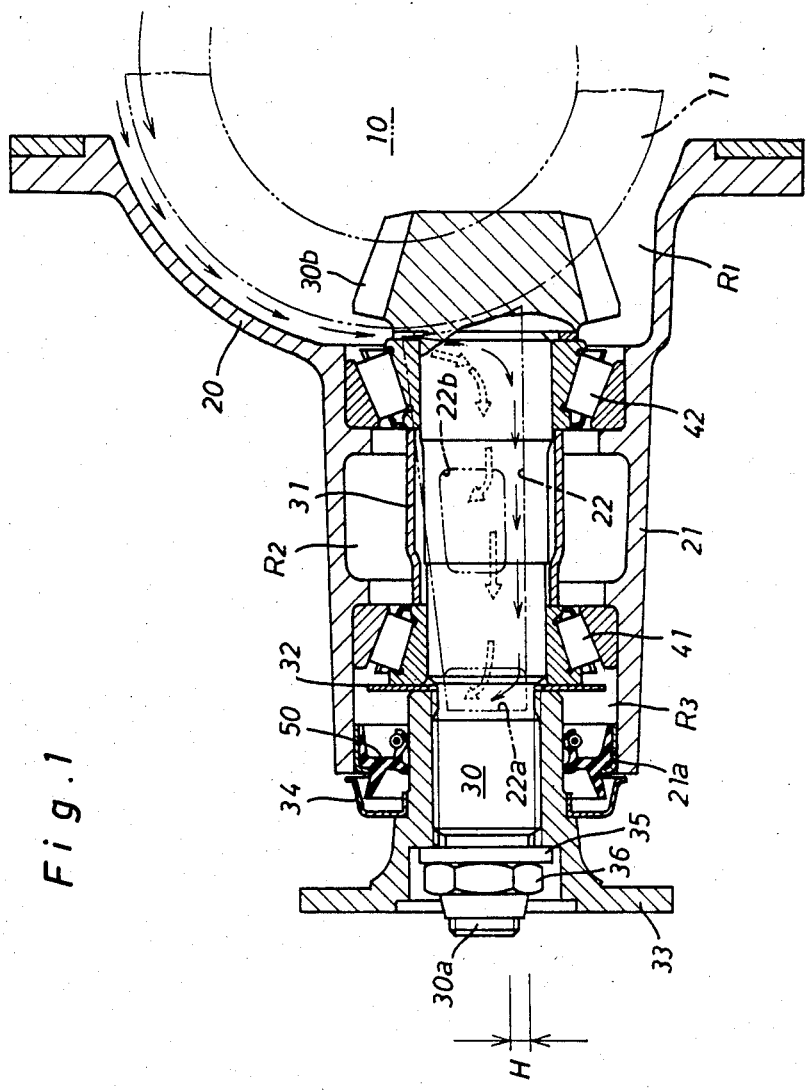
FIG. 1 is a vertical sectional view of a final drive and differential unit in accordance with the present invention.
Figure 2:
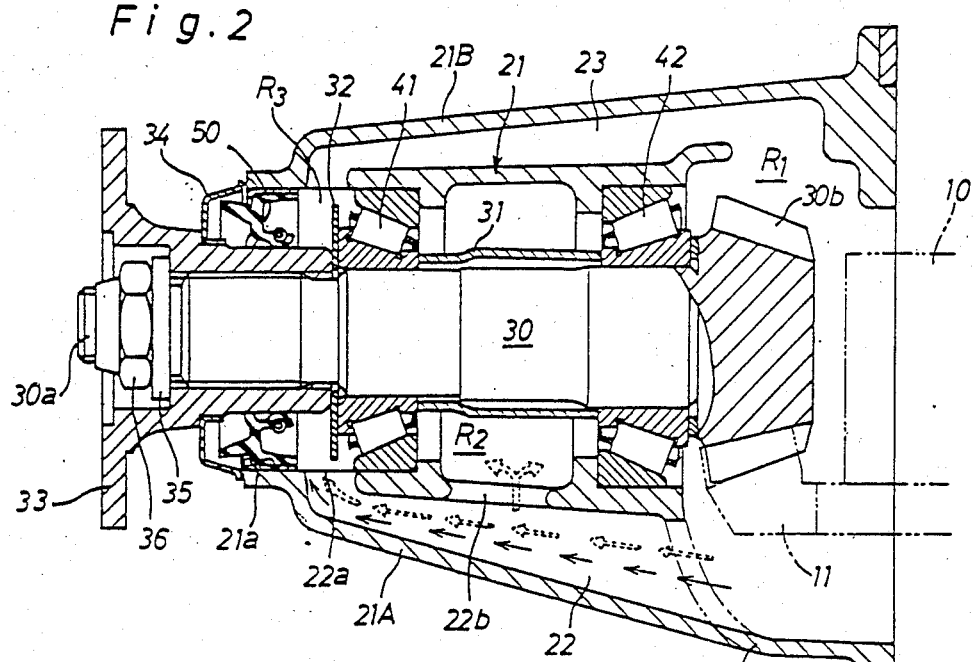
FIG. 2 is a horizontal sectional view of the final drive and differential unit of FIG. 1, taken along line II—II in FIG. 3.

Referring now to the drawings, in particular to FIGS. 1 and 2, there is illustrated a final drive and differential unit for a motor vehicle of the front engine, rear wheel drive type. The final drive and differential unit comprises a differential carrier 20 integrally formed with a cylindrical support structure 21 and arranged to be coupled with an axle housing (not shown) in a fluid tight manner to store an amount of lubricating oil therein, a differential gear unit 10 rotatably mounted within the carrier 20, a ring gear 11 contained within the carrier 20 and mounted on the differential gear unit 10 for rotation therewith, and a drive pinion shaft 30 rotatably supported by a pair of axially spaced tapered roller bearings 41 and 42 mounted within the cylindrical support structure 21 and positioned in place by means of a cylindrical spacer 31. The drive pinion shaft 30 is integrally provided at its inner end with a drive pinion 30b which is located in the interior of the carrier 21 and permanently in mesh with the ring gear 11. The drive pinion shaft 30 extends outwardly from the cylindrical support structure 21 of carrier 20.

In the above arrangement, a companion flange 33 is splined to the drive pinion shaft 30 and fixed in place by means of a fastening nut 36 threaded over the outer end 30a of shaft 30 through a washer 35. An annular oil seal member 50 is fixedly mounted within an outer end portion 21a of cylindrical support structure 21 and is in surrounding relationship with a cylindrical portion of companion flange 33 to close the interior of cylindrical support structure 21 in a fluid tight manner. An annular dust deflector 34 is fixed to a neck portion of companion flange 33 and coupled over the outer end 21a of cylindrical support structure 21. A circular oil slinger 32 is mounted on the drive pinion shaft 30 and fixed in place by engagement with the inner end of companion flange 33 and an inner race of bearing 41 for rotation therewith.

Figure 3:
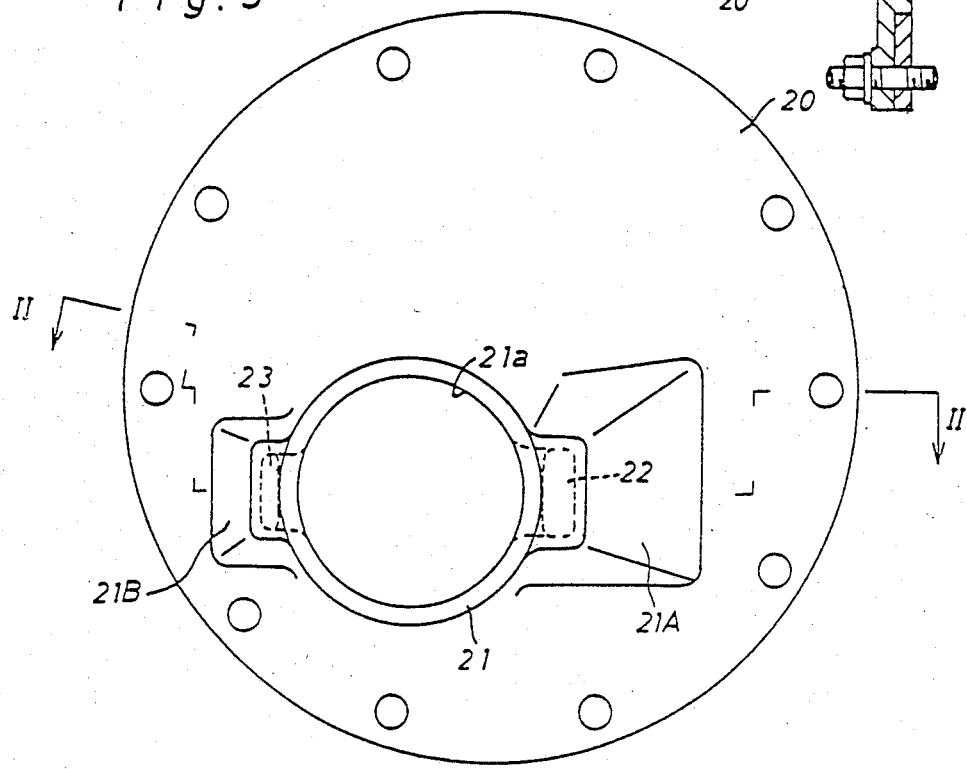
FIG. 3 a front view of a differential carrier showing oil passages formed in the opposite side walls of a cylindrical support structure of the carrier.

As is illustrated in FIGS. 2 and 3, the cylindrical support structure 21 of carrier 20 is integrally formed at one side thereof with an enlarged portion 21A formed therein with an oil supply passage 22 and at the other side thereof with another enlarged portion 21B formed therein with an oil return passage 23. The oil supply passage 22 is arranged in parallel with the drive pinion shaft 30 at the same side as the ring gear 11 and opens at its rear end into a first chamber $R_1$ in which the lubricating oil is stored. The oil supply passage 22 opens at its intermediate portion into a second chamber $R_2$ in the form of an annular space around the drive pinion shaft 30 between the bearings 41 and 42 and further opens at its front end into a third chamber $R_3$ in the form of an annular space around the drive pinion shaft 30 between the front bearing 41 and the oil seal member 50. The cylindrical support structure 21 is formed in its side wall with a rectangular lateral hole 22a which is arranged to permit the flow of lubricating oil from the oil supply passage 22 into the third chamber $R_3$. The cylindrical support structure 21 is further formed in its side wall with a rectangular lateral hole 22b which is arranged to permit the flow of lubricating oil from the oil supply passage 22 into the second chamber $R_2$. In such arrangement of the oil supply passage 22, the lowermost edge of lateral hole 22a is positioned below the lowermost edge of lateral hole 22b with a predetermined distance H. The oil return passage 23 is arranged in parallel with the drive pinion shaft 30 at the opposite side of the ring gear 11 and opens at its front end into the third chamber $R_3$ and at its rear end into the first chamber $R_1$.

Assuming that the drive pinion shaft 30 is applied with a drive torque from a prime mover of the vehicle to rotate the ring gear 11 in a counterclockwise direction, the lubricating oil is picked up by rotation of the ring gear 11 and flows into the oil supply passage 22. When the ring gear 11 is rotated at a low speed, a small amount of lubricating oil is picked up by rotation of the ring gear 11 and flows through the bottom portion of supply passage 22. In such a condition, as is illustrated by solid arrows in FIGS. 1 and 2, almost all the lubricating oil in supply passage 22 flows into the third chamber, $R_3$ across the lateral hole 22a to effect sufficient lubrication of the front bearing 41 and the oil seal member 50. Meanwhile, the rear bearing 42 is sufficiently lubricated by the lubricating oil directly splashed thereon. When the ring gear 11 is rotated at a high speed, a large amount of lubricating oil is picked up by rotation of the ring gear 11 and flows through the upper portion of supply passage 22. In such a condition, as is illustrated by dotted arrows in FIGS. 1 and 2, the lubricating oil in supply passage 22 flows into the second and third chambers $R_2$ and $R_3$ respectively across the lateral holes 22b and 22a to effect sufficient lubrication of both the tapered roller bearings 41 and 42 and the oil seal member 50. Then, a portion of the lubricating oil passing through the bearing 41 flows into the third chamber $R_3$ and returns into the first chamber $R_1$ through the return passage 23, while the remaining portion of the lubricating oil passing through the bearing 42 directly returns into the first chamber $R_1$. This serves to avoid excessive entry of the lubricating oil into the third chamber $R_3$ and to prevent the oil seal member 50 from leakage of the oil thereacross.

Although a certain specific embodiment of the present invention has been shown and described, it is obvious that many modifications and variations thereof are possible in light of these teachings. It is to be understood therefore that within the scope of the appended claims, the invention may be practiced otherwise that as specifically described herein.

What is claimed is:

1. A final drive and differential unit for a motor vehicle comprising:

a cylindrical support structure including an outer end and an inner end;

a drive pinion mounted on said inner end of said cylindrical support sturcture;

a differential carrier integrally formed with said cylindrical support structure and arranged to store an amount of lubricating oil therein;

a differential gear unit rotatably mounted within said differential carrier;

a ring gear located within said differential carrier and mounted on said differential gear unit for rotation therewith;

a drive pionon shaft and a pair of axially spaced bearings, said drive pinion shaft and said pair of axially spaced bearings being located within said cyclindrical support structure, said axially spaced bearings supporting said drive pinion shaft;

an annular oil seal member being mounted within said outer end of said cylindrical support structure, said drive pinion shaft extending outwardly through said annular oil seal member, a first annular space being defined between said annular oil seal member and a first bearing of said pair of axially spaced bearings, and a second annular space being defined between said pair of axially spaced bearings;

said cylindrical support structure of said differential carrier including a first side and a second side, said first side including a first enlarged portion, said first englarged portion, said first enlarged portion including an oil supply passage which is parallel to said drive pinion shaft, said oil supply passage having a first end and a second end, said first end being in open communication with the interior of said differential carrier said second side of said cylindrical support structure of said differential carrier including a second enlarged portion, said second enlarged portion incuding an oil return passage which is in parallel with said drive pinion shaft, said oil return passage including a first end and a second end, said first end being in open communication with the interior of said differential carrier and said second end being in communication with said first annular space, said cylindrical support structure including a side wall, said side wall including a first lateral hole connecting an intermediate portion of said oil supply passage with said second annular space and a second lateral hole connecting the second end of said oil supply passage with said first annular space, said first lateral hole including a first lowermost edge and said second lateral hole including a second lowermost edge, said second lowermost edge being below said first lowermost edge in a horizontal direction to ensure lubricating oil will flow into said first annular space.

2. The final drive and differential unit according to claim 1, further comprising an annular oil slinger arranged adjacent to said first bearing and mounted on said drive pinion shaft for rotation therewith.

3. The final drive and differential unit according to claim 1, wherein said first and second lateral holes are in the form of a rectangular openings.

* * * * *